(12) United States Patent
Rubin (10) Patent No.: US 10,482,181 B1
(45) Date of Patent: Nov. 19, 2019

(54) DEVICE, METHOD, AND SYSTEM FOR EXPERT CASE-BASED NATURAL LANGUAGE LEARNING

(71) Applicant: The United States of America, as represented by the Secretary of the Navy, San Diego, CA (US)

(72) Inventor: Stuart Harvey Rubin, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/051,917

(22) Filed: Aug. 1, 2018

(51) Int. Cl.
  *G06F 17/20* (2006.01)
  *G06F 17/27* (2006.01)
  (Continued)

(52) U.S. Cl.
  CPC .......... *G06F 17/2785* (2013.01); *G06F 16/22* (2019.01); *G06F 16/2457* (2019.01); *G06N 5/02* (2013.01); *G06F 3/0481* (2013.01)

(58) Field of Classification Search
  CPC ...... G06F 17/20; G06F 17/21; G06F 17/2241; G06F 17/2282; G06F 17/245; G06F 17/248; G06F 17/27; G06F 17/2705; G06F 17/271; G06F 17/2715; G06F 17/2735; G06F 17/2765; G06F 17/2775; G06F 17/278; G06F 17/2785; G06F 17/279; G06F 17/28; G06F 17/2872; G06F 17/2881
  (Continued)

(56) References Cited

U.S. PATENT DOCUMENTS 5,444,823 A * 8/1995 Nguyen ................. G06N 5/027
                                                                  706/54
7,047,226 B2   5/2006 Rubin
(Continued)

OTHER PUBLICATIONS

Rubin et al, "On Heuristic Randomization and Reuse as an Enabler of Domain Transference", IEEE International Conference on Information Reuse and Integration (IRI), Aug. 2015.
(Continued)

*Primary Examiner* — Qi Han
(74) *Attorney, Agent, or Firm* — Naval Information Warfare Center, Pacific; Kyle Eppele (57) ABSTRACT

A computing device for expert case-based natural language learning includes a blackboard database, a top level mapper, and a bottom level case-based inference engine, and a bottom level translator. The blackboard database is configured to store context information corresponding to case semantics associated with natural language sentential forms. The case semantics include situation semantics and action semantics. The top level mapper is configured to query the blackboard database for the context information, map the situation semantics to the action semantics using the context information to form new case semantics, and store the new case semantics in a bottom level case database. The bottom level case-based inference engine is configured to match an input natural language sentential form to a matching case semantic stored in the bottom level case database. The bottom level translator is configured to translate the matching case semantic into natural language sentential form.

20 Claims, 4 Drawing Sheets

(51) Int. Cl.
  *G06N 5/02* (2006.01)
  *G06F 16/22* (2019.01)
  *G06F 16/2457* (2019.01)
  *G06F 3/0481* (2013.01)

(58) Field of Classification Search
  USPC .................................. 704/9, 1, 2, 7, 10, 257
  See application file for complete search history.

(56) References Cited

U.S. PATENT DOCUMENTS

| | | | |
|---|---|---|---|
| 7,295,496 | B2 | 11/2007 | Moczygemba |
| 8,285,728 | B1 | 10/2012 | Rubin |
| 8,315,956 | B2 | 11/2012 | Vashist |
| 8,447,720 | B1 * | 5/2013 | Rubin .................... G06N 5/025 706/52 |
| 8,489,648 | B1 | 7/2013 | Rubin |
| 9,299,025 | B1 | 3/2016 | Rubin |
| 9,396,441 | B1 | 7/2016 | Rubin |
| 9,471,885 | B1 | 10/2016 | Rubin |
| 2002/0059193 | A1 * | 5/2002 | Decime .................. G06Q 10/10 |
| 2002/0178005 | A1 | 11/2002 | Dusan et al. |
| 2007/0124263 | A1 | 5/2007 | Katariya et al. |
| 2017/0039374 | A1 | 2/2017 | Rubin |
| 2017/0371861 | A1 | 12/2017 | Barborak et al. |
| 2019/0272382 | A1 * | 9/2019 | Dubyak .............. G06F 17/2705 |

OTHER PUBLICATIONS

Mccaney, "New Project Wants AI to Explain Itself", https://defensesystems.com/articles/2016/08/11/xai-darpa-explainable-artificial-intelligence.aspx, Aug. 11, 2016.
Lecun, "What's Wrong with Deep Learning?", http://www.pamitc.org/cvpr15/files/lecun-20150610-cvpr-keynote.pdf, Jun. 10, 2015.
Rubin, "On Randomization and Discovery", Information Sciences, vol. 177, pp. 170-191, Jan. 1, 2007.
Chaitin, "Randomness and Mathematical Proof", Scientific American 232, No. 5, pp. 47-52, May 1975.
Rubin et al. "KASER: Knowledge Amplification by Structured Expert Randomization", IEEE Transactions on Systems, Man, and Cybernetics—Part B: Cybernetics, vol. 34, No. 6, Dec. 2004.
Biermann, "Automatic Programming: A Tutorial on Formal Methodologies", J. Symbolic Computation, vol. 1, No. 2, 1985.
Eliasson, "The Use of Case-Based Reasoning in a Human-Robot Dialog System", LinkÄoping Studies in Science and Technology, Thesis No. 1248, 2006.
Prentzas et al, "Integrations of Rule-Based and Case-Based Reasoning", Dept. of Computer Engine, & Informatics, University of Patras, 26500 Patras, Hellas (Greece) & Research Academic Computer Technology Institute, Patras, Hellas (Greece), Springer-Verlag Berlin Heidelberg 2002.
Hindin, H. J., "Intelligent Tools Automate High-Level Language Programming," Computer Design, vol. 25, pp. 45-56, 1986.

* cited by examiner

DEVICE, METHOD, AND SYSTEM FOR EXPERT CASE-BASED NATURAL LANGUAGE LEARNING

FEDERALLY-SPONSORED RESEARCH AND DEVELOPMENT

The United States Government has ownership rights in this the subject matter of the present disclosure. Licensing inquiries may be directed to Office of Research and Technical Applications, Space and Naval Warfare Systems Center Pacific, Code 72120, San Diego, Calif., 92152; telephone: (619) 553-5118; email: ssc_pac_t2@navy.mil, referencing Navy Case 104882.

BACKGROUND

Artificial intelligence systems include expert systems and case-based systems. An expert system is a computer system that emulates the decision-making ability of a human expert. Expert systems are designed to solve complex problems by reasoning through bodies of knowledge, represented as a segmented base of if-then rules, where there is no other explicit connection among the rules.

Case-based systems model events and their causalities using situation-action codes. These systems solve new problems based on the solutions of similar past problems.

In both expert systems and case-based systems, similar cases cannot be predicted but can only be acquired experientially. As a result, in both conventional expert and case-based systems, all acquired knowledge is mutually random. Neither expert systems nor case based systems express knowledge using natural language. This means that the representation of knowledge by these systems is neither easy to understand or extend.

While methodologies have been proposed for computational natural language understanding based on hidden-layer neural networks, they cannot tractably learn and cannot retain all of the fundamental memories. Also, a deep learning neural network cannot explain its decisions or actions.

Rule-based approaches to natural language processing need to deal with the fact that there are more exceptions than rules. Rule-based approaches have not been successful in learning these exceptions to date. Nevertheless, attempts have been made to overcome this limitation through the use of brute force (i.e., hand-coding virtually everything which a person might ask in a specific domain). Such approaches do not benefit from domain transference. Thus, they could never pass the Turing Test if one moves slightly askew of the domain of discourse.

In view of the above, it would be desirable to address shortcomings of conventional expert systems and case-based systems.

SUMMARY

According to an illustrative embodiment, a computing device for expert case-based natural language learning includes a blackboard database, a top level mapper, a bottom level case-based inference engine, and a bottom level translator. The blackboard database is configured to store context information corresponding to case semantics associated with natural language sentential forms. The case semantics include situation semantics and action semantics. The top level mapper is configured to query the blackboard database for the context information, map the situation semantics to the action semantics using the context information to form new case semantics, and store the new case semantics in a bottom level case database. The bottom level case-based inference engine is configured to match an input natural language sentential form to a matching case semantic stored in the bottom level case database. The bottom level translator is configured to translate the matching case semantic into natural language sentential form, and the bottom level case-based inference engine is further configured to post context information corresponding to the translated matching case semantic to the blackboard database.

These, as well as other objects, features and benefits will now become clear from a review of the following detailed description, the illustrative embodiments, and the accompanying drawings.

BRIEF DESCRIPTION OF THE DRAWINGS

Features of illustrative embodiments will be best understood from the accompanying drawings, taken in conjunction with the accompanying description, in which similarly-referenced characters refer to similarly-referenced parts. The elements in the drawings may not be drawn to scale. Some elements and/or dimensions may be enlarged or minimized, as appropriate, to provide or reduce emphasis and/or further detail.

DETAILED DESCRIPTION OF VARIOUS EMBODIMENTS

References in the present disclosure to "one embodiment," "an embodiment," or similar phrases, means that a particular element, feature, structure, or characteristic described in connection with the embodiments is included in at least one embodiment. The appearances of the phrases "in one embodiment," "in some embodiments," and "in other embodiments," or similar phrases, in various places in the present disclosure are not necessarily all referring to the same embodiment or the same set of embodiments.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of "the," "a," or "an" are employed to describe elements and components of the embodiments herein; this is done merely for grammatical reasons and to conform to idiomatic English. This detailed description should be read to include one or at least one, and the singular also includes the plural unless it is clearly meant otherwise.

According to illustrative embodiments, an expert case-based computing device, system, and method are provided for natural language learning. Input natural language (NL) sentential forms, such as questions and statements, are matched to a case semantic by a bottom level case-based system. A top level expert rule-based system maps other NL sentential forms to other case semantics. The top level rule-based system updates the matching case semantics based on the other case semantics according to predefined rules. In this manner, a two-level knowledge-based system is provided that is capable of applying knowledge, represented in NL, to the interpretation of NL.

Figure 1:
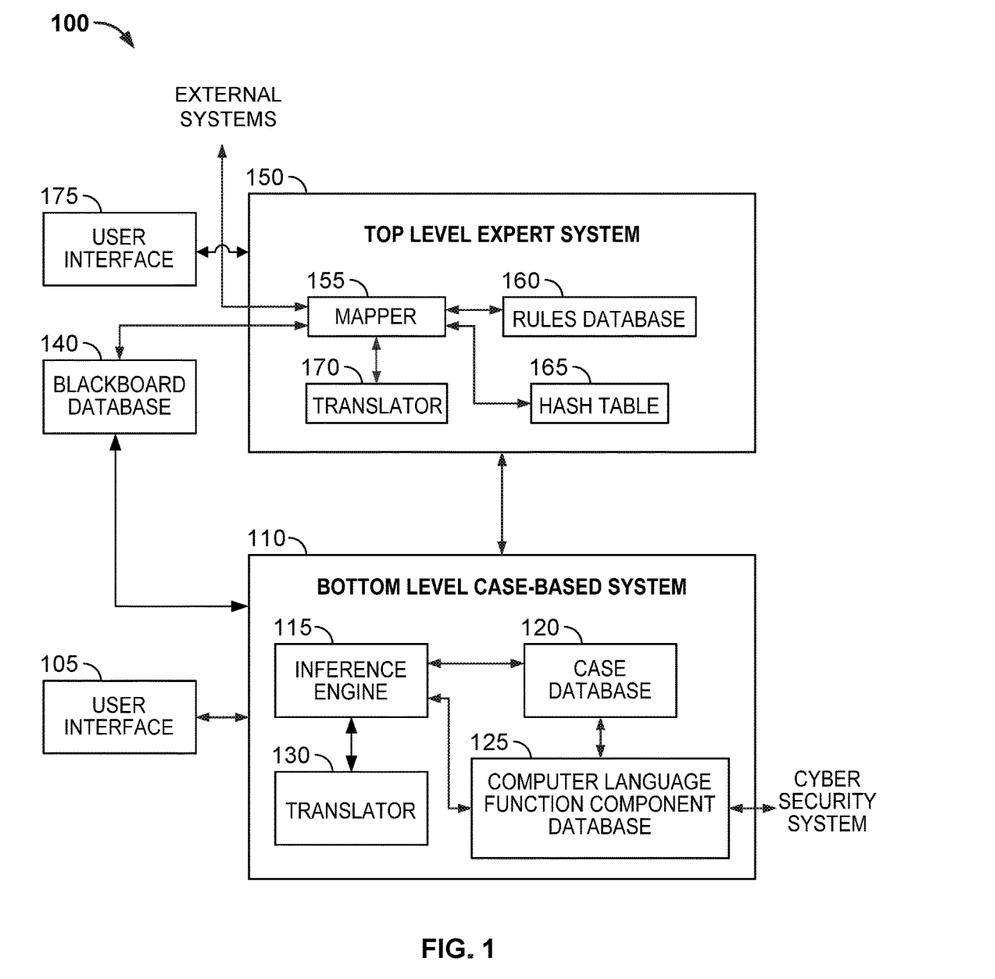
FIG. 1 illustrates the architecture of a cyber-secure two-level expert case-based natural language learning system according to an illustrative embodiment.

FIG. 1 illustrates the architecture of a cyber-secure two-level expert case-based natural language learning system according to an illustrative embodiment. As shown in FIG. 1, the expert case-based learning system 100 includes a bottom level case-based system 110, a blackboard database 140, a top level expert system 150, and user interfaces 105 and 175. The bottom level case-based system 110, the blackboard database 140, and the top level expert system 150 may be included in a computing device, such as the computing device 400 shown in FIG. 4 and described in more detail below.

The user interfaces 105 and 175 are configured to receive NL sentential forms from one or more users and provide the NL sentential forms to the bottom level case-based system 110 and the top level expert system 150, respectively, via any suitable wired or wireless connection. The NL sentential forms, including statements and/or questions, are context-free and non-deterministic. The user interfaces 105 and 175 are also configured to receive translated NL sentential forms, translated by the bottom level case-based system 110 and the top level expert system 150, respectively, and provide the translated NL sentential forms for verification and/or correction by the user(s).

The user interfaces 105 and 175 may be implemented with any suitable user interface, such as a microphone, a keypad, a touchscreen, etc. The user interfaces 105 and 175 may be included, for example, in a handheld computing device, a personal computer, etc. Although two user interfaces 105 and 175 are shown for ease of explanation, it should be appreciated that one user interface may communicate with both the top level expert system 150 and the bottom level case-based system 110.

As shown in FIG. 1, the bottom level case-based system 110 includes a bottom level inference engine 115, a case database 120, a translator 130, and a computer language function component database 125. The bottom level inference engine 115 is configured to receive an input NL sentential form from the user interface 105 and match the input NL sentential form to a matching case semantic stored in a case database 120. The case database 120 is configured to store a plurality of case semantics, including situation semantics and associated action semantics. The stored case semantics are populated and updated as appropriate by the top level expert system 150, as described in further detail below.

The bottom level inference engine 115 is configured to iteratively select the most-specific case semantic stored in the case database 120, allowing for spiral development. In particular, the bottom level inference engine 115 is configured to select the situation semantic that most specifically matches the situation expressed in the input NL sentential form. If the case database 120 does not include a situation semantic that exactly matches the situation expressed in the NL sentential form, then the situation semantic having the greatest percentage intersection with the situation expressed in the NL sentential form is selected. If there is more than one case semantic stored in the case database 120 that matches the input NL sentential form, the headmost case semantic is selected as the matching case semantic.

The bottom level inference engine 115 is further configured to post the matching case semantic, including the selected situation semantic and an associated action semantic, as context information on the blackboard database 140. The bottom level inference engine 115 is also configured to obtain/receive context information from the blackboard database 140.

The blackboard database 140 is configured to store context information in the form of situation semantics and action semantics that are posted and obtained/received by computer language function components associated with the situation semantics and action semantics. According to one embodiment, the matching case semantic selected by the bottom level inference engine 115 is translated by the translator 130 into a NL sentential form, and the translated NL sentential form is posted as the context information on the blackboard database 140.

For example, consider an input NL sentential form "I'm hungry, where can I get food?" The input NL sentential form is associated with a situation, i.e., "hungry." The bottom level inference engine 115 matches the input NL sentential form with a case semantic including a situation semantic indicating that a user is hungry. The case semantic also includes an action semantic indicating an action to take in case the situation "hungry" is true, e.g., "Drive to the grocery store." The situation semantic and the action semantic are associated with computer language function components that cause the situation semantic "hungry" and the action semantic "Drive to the grocery store" to be posted to the blackboard database 140. The computer language function components are stored in a computer language function component database 125 for retrieval by a cyber-security system as described in further detail below with reference to FIG. 3.

In addition to storing the context information corresponding to the matching case semantic posted by the inference engine 115, the blackboard database 140 is also configured to store context information corresponding to case semantics associated with other NL sentential forms. In addition, the blackboard database 140 may contain context information corresponding to the NL output of instantiated sensor-functions. This context information may be posted to the blackboard database 140 by the top level expert system 150 and/or external systems. Context information is posted to the blackboard database in distinct states.

Using the example above, the blackboard database 140 may contain context information "hungry" and "Drive to the grocery store" that corresponds to the situation semantic and the action semantic of the matching case semantic posted by the inference engine 115. The blackboard database 140 may also contain other context information, e.g., "need food," that corresponds to a situation semantic of a case semantic associated with another NL sentential form. The blackboard database 140 may also contain context information, e.g., "Drive to the grocery store on Rose Lane via Dochester Street" and "Drive to the grocery store on Rose Lane via Mulberry Lane" that correspond to action semantics of case semantics associated with other NL sentential forms.

The top level expert system 150 includes a top level mapper 155, a rules database 160, a hash table 165, and a translator 170. The mapper 155 is configured to query the blackboard database 140 for the context information corresponding to the matching case semantic and the other context information corresponding to the other case semantics. Such context information may be in the form of NL.

The mapper 155 is further configured to map the situation semantics contained in the matching case semantic and the other case semantics to the action semantics contained in the matching case semantic and the other case semantics.

The rules database 160 is configured to store predefined rules which may be populated through interaction with users in NL. The top level mapper 155 is configured to map the situation semantics to the action semantics according to the predefined rules using the context information on the blackboard database 140.

According to an illustrative embodiment, the predefined rules for mapping include a first set of non-monotonic rules for mapping the situation semantics to a randomized situation semantic, a second set of non-monotonic rules for mapping the randomized situation semantic to the action semantics, and a third set of non-monotonic rules for mapping the action semantics to a randomized action semantic.

Situation semantics may include sets of situation semantics. Action semantics may include sequences of action semantics. Thus, the non-monotonic rules stored in the rules database 160 may be segmented by situation subset magnitude or action subsequence length. According to an illustrative embodiment, the most-specific (i.e., longest) subset/subsequence is always the first to be randomized by applying the non-monotonic rules. Randomization re-starts with the most-specific subset/subsequence after each successful randomization.

According to an illustrative embodiment, the non-monotonic rules are stored in lists in the rules database 160. As they are acquired, the non-monotonic rules are logically moved to their list heads. As the non-monotonic rules are updated, e.g., via NL interaction with users or other expert systems, rules at the tails of the lists are expunged using tail-deletion. Though a list representation can easily hold millions of non-monotonic rules, tail-end deletion conserves memory.

Referring again to the example above, the top level mapper 155 is configured to apply the first set of non-monotonic rules to map the context information "need food" and "hungry" that correspond to situations semantics from the blackboard database 140 into a randomized situation semantic corresponding to the situation "hungry." The top level mapper 155 is further configured to apply the second set of non-monotonic rules to map the randomized situation semantic corresponding to the situation "hungry" to the context information "Drive to the grocery store on Rose Lane via Dochester Street" and "Drive to the grocery store on Rose Lane via Mulberry Lane" that correspond to action semantics. The top level mapper 155 is further configured to map the context information "Drive to the grocery store on Rose Lane via Dochester Street" and "Drive to the grocery store on Rose Lane via Mulberry Lane" to a randomized action semantic corresponding to the action "Drive to the grocery store on Rose Lane."

In some instances, context information corresponding to action semantics may not be posted to the blackboard database 140. Thus, the top level mapper 155 is further configured to query external systems, such as users and other two-level knowledge based systems for additional context information corresponding to the action semantics. For example, users may be queried for randomized action semantics, and the two-level knowledge based system may be queried for symmetric action semantics. Such queries may be made via any suitable wired or wireless connection, using the translator 170 to translate the queries into NL form, as necessary. The top level mapper 155 provides the external systems with the opportunity to restate or augment their answers as desired. Situation action semantics and associated action semantics may also be hierarchically indexed in a hash table 165 for retrieval by subject (e.g., the brute force approach).

By querying the blackboard database 140 and external systems for context information expressed in NL, the top level expert system 150 gains knowledge that is used to build upon its rule database. This knowledge is used for mapping NL sentential forms to new case semantics for use by the bottom level case-based system 110.

In particular, the mapper 155 is further configured to form a new case semantic using the situation semantics mapped to the action semantics, and the new case semantic is stored in the case database 120. If the new case semantic is different than a matching case semantic selected by the bottom level inference engine 115, the matching case semantic is replaced with the new case semantic, and the case semantic is stored in the case database 120. If the new case semantic is the same as a matching case semantic selected by the bottom level inference engine 115, replacement is not necessary, and the matching case semantic may remain in the case database 120 but be moved to the logical list head. In this manner, the top level system 150 may update the case database 120 as the top level expert system 150 gains knowledge by making associations between case semantics, thereby building upon the plurality of case semantics stored in the case database 120.

Using the example above, the randomized action semantic "Drive to the grocery store on Rose Lane" is different, i.e., more specific, than the action semantic "Drive to the grocery store" that is stored in the case database 120. Accordingly, the matching case semantic initially selected by the inference engine 115 from the case database 120 is replaced with a new case semantic including a situation semantic corresponding to the situation "hungry" and an action semantic corresponding to the action "Drive to the grocery store on Rose Lane."

In addition to forming a new semantic based on the context information corresponding to the matching case semantic and other context information, as described above, the mapper 155 is further configured to form additional case semantics based on other context information contained in the blackboard database 140. These additional case semantics are stored by the bottom level case-based system 110 in the case database 120. In this manner, the top level expert system 150 populates the case database 120 with case semantics as the top level expert system 150 gains knowledge.

The translator 130 is configured to translate the updated matching semantic (or the matching semantic, if no update is required) to a NL sentential form and provide the translated NL sentential form to the user interface 105 for verification and/or correction by the user.

It should be appreciated that the situation semantics and the action semantics acquired and mapped by the top level expert system 150 are associated with computer language function components. These computer language function components may be stored within the computer language function component database 125 or in another database, along with other computer language function components, to be checked for validity by a cyber-security system to provide for protection against intrusion and hijacking.

Further, although not shown for simplicity of illustration, the expert case-based NL system 100 may also include an explanation subsystem that provides to a user a non-deterministic explanation of the situation that was understood and/or why the stated (non-deterministic) action ensued, using natural language, upon invocation. This explanation may be provided via, e.g., the translator 170 and the user interface 175. Mapped situational semantics may be inverted to produce a set of context-free (non-deterministic) NL explanations. Action semantic sequences may be inverted to produce similar context-free (non-deterministic) NL explanations. Non-monotonic rules may be inverted to provide explanations of optimizations upon request.

Figure 2:
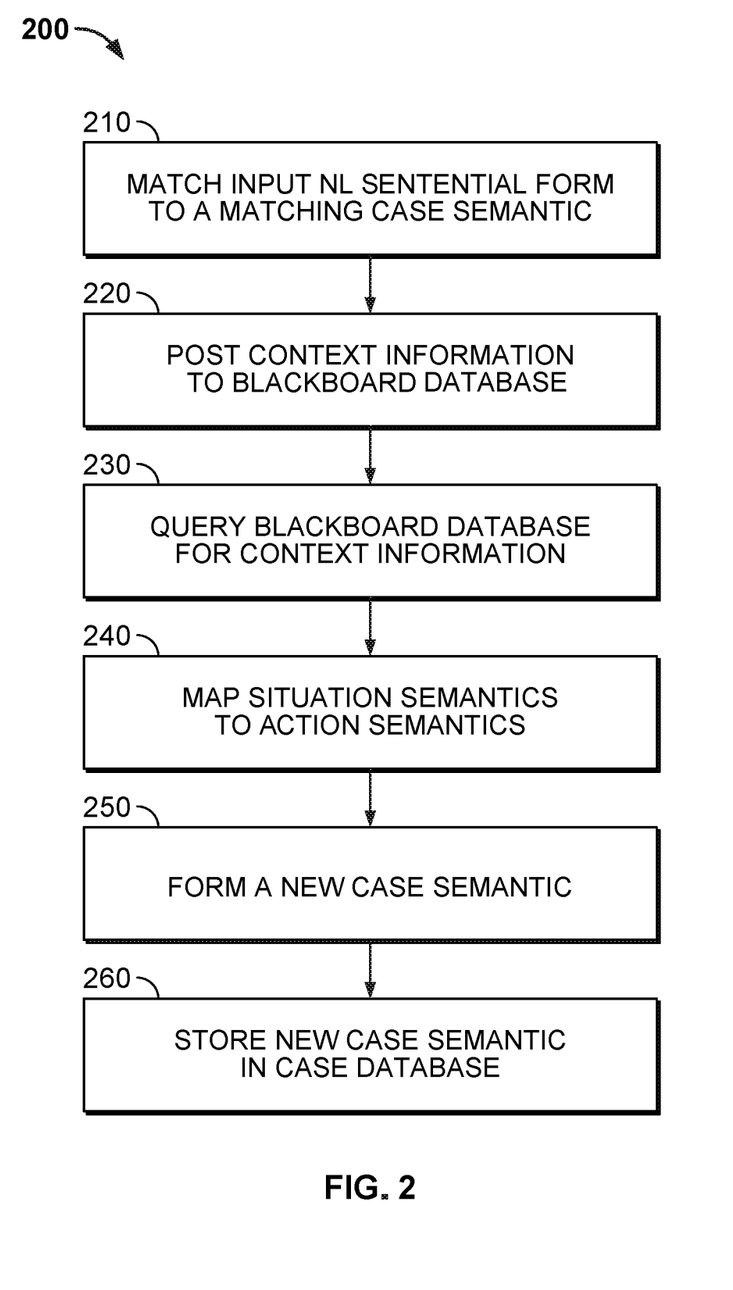
FIG. 2 illustrates a flow chart showing steps in a process for cyber-secure expert case-based natural learning according to an illustrative embodiment.

Turning now to an explanation of the process involved in expert case-based NL learning, FIG. 2 illustrates a flow chart showing steps in a process for cyber-secure expert case-based natural learning according to an illustrative embodiment. Process 200 may be implemented as a series of modules, and the modules may function in concert with physical electronic and computer hardware devices. Such modules may be utilized separately and/or together, locally and/or remotely, to form a program product thereof, which may be implemented through recordable media. Some or all of the steps of process 200 may be stored within non-transitory computer-readable media, wherein the steps are represented by computer-readable programming code. For illustrative purposes, process 200 will be discussed with reference to the system shown in FIG. 1. It should be appreciated that the steps and order of steps described and illustrated are provided as examples. Fewer, additional, or alternative steps may also be involved and/or some steps may occur in a different order or simultaneously with other steps. The above considerations are also applicable to process 300 shown in FIG. 3.

Referring to FIG. 2, the process 200 begins at step 210 at which an input NL sentential form is matched to a matching case semantic among a plurality of case semantics stored in a case database in the bottom level case-based system. This step may be performed by, e.g., the bottom level inference engine 115 included in the bottom level case-based system 110 shown in FIG. 1. The NL sentential form may be received from a user interface 105 shown in FIG. 1.

At step 220, context information corresponding to the matching case semantic is posted, e.g., by the bottom level inference engine 115, to a blackboard database, such as the blackboard database 140 shown in FIG. 1. The context information may include the matching case semantic, translated into NL sentential form by the translator 130. The blackboard database also contains other context information corresponding to other case semantics associated with other NL sentential forms.

At step 230, the blackboard database is queried, e.g., by the top level mapper 155 shown in FIG. 1 for context information corresponding to the matching case semantic. This context information may also include other context information corresponding to other case semantics associated with other natural language sentential forms. This other context information may be posted to the blackboard database by, e.g., the top level mapper 155 shown in FIG. 1 and/or external systems. This other context information may be posted in response to queries from the top level mapper 155. Such queries may be translated into NL sentential form by, e.g., the translator 170.

The matching case semantics and the other case semantics include situation semantics and action semantics. At step 240, the situation semantics are mapped to the action semantics according to predefined rules using the context information corresponding to the matching case semantic and the other context information corresponding to the other case semantics. Mapping may be performed, e.g., by the top level mapper 155 shown in FIG. 1. According to an illustrative embodiment, mapping includes mapping the situation semantics to a randomized situation semantic, mapping the randomized situation semantic to the action semantics, and mapping the action semantics to a randomized action semantic.

At step 250, a new case semantic is formed, e.g., by the top level mapper 155 shown in FIG. 1. At step 260, the new case semantic is stored in the case database in the bottom level case-based system. It should be appreciated that if the new case semantic is not different than the matching case semantic already stored in the case database, the matching case semantic may remain in the case database 120. If the new case semantic is different than the matching case semantic, the matching case semantic may be replaced with the new case semantic. In this manner, the plurality of case semantics in the bottom level case database is built upon and updated by the top level system.

Figure 3:
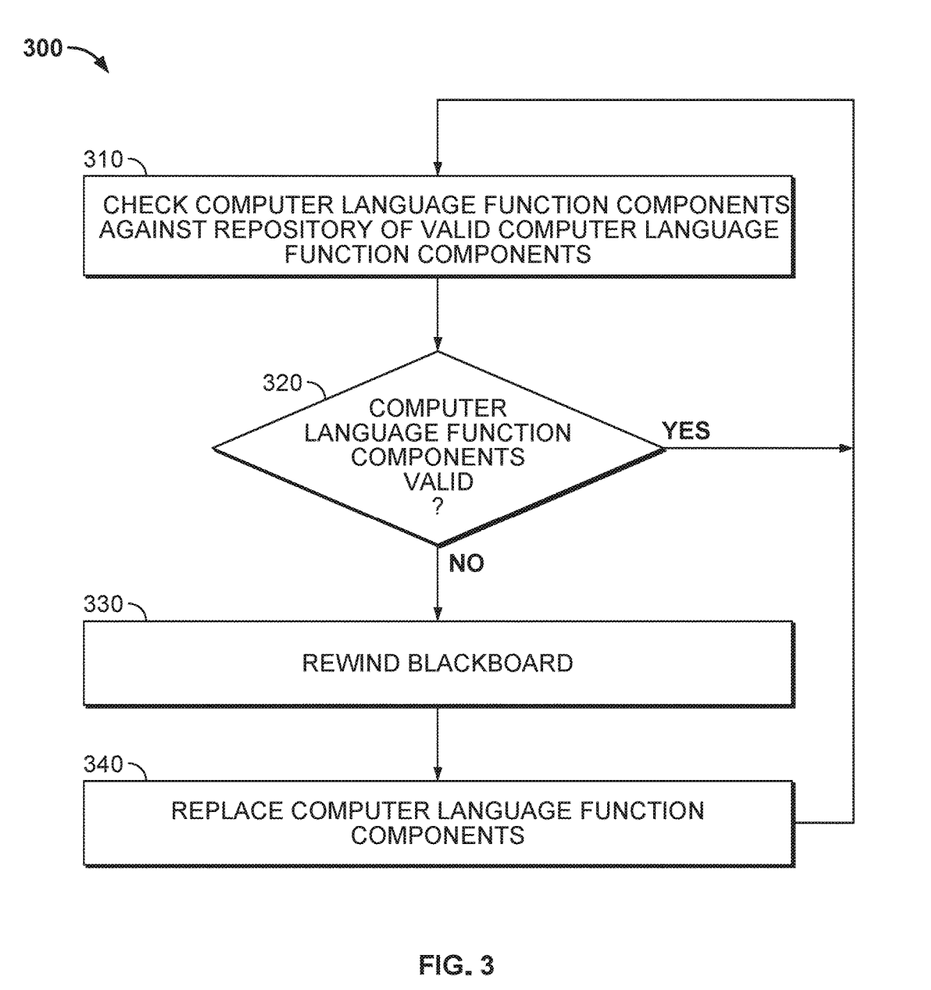
FIG. 3 illustrates a flow chart showing steps in a process for static code analysis according to an illustrative embodiment.

Turning now to the security concerns, according to an illustrative embodiment, cybersecurity is realized through static code analysis. This may be understood with reference to FIG. 3 which illustrates a flow chart showing steps in a process for cyber-secure static code analysis including testing for hijacking according to an illustrative embodiment. As shown in FIG. 3, the process 300 begins at step 310 with checking the code contained in the computer language function components stored, e.g., in the computer language function component database 125 shown in FIG. 1, against valid code contained in computer language function components stored in an external repository. The external repository may only be written to under controlled (secure) conditions using a capability access model. Step 310 may be performed by any suitable computer-based device that queries the computer language function component database 125 via a wired or wireless connection.

At step 320, a determination is made whether the computer language function components stored in the computer language function component database 125 are valid, i.e., whether they are the same or equivalent to the valid computer language function components stored in the external repository. This step may be performed with respect to a benchmarked test set of computer language function components that was previously compared against the set of valid computer language function components.

If it is determined at step 320 that the computer language function components stored in the computer language function component database 125 are valid, the process returns to step 310 and is repeated, e.g., with a predetermined frequency. The frequency with which the computer language function components stored in the computer language function component database 125 are checked against valid computer language function components determines the degree of cyber-security that can be attained.

If it is determined at step 320 that the computer language function components are not valid, the states of the blackboard database 140 are rewound at step 330 (i.e., the states are returned to their previous conditions/settings/values), and the compromised computer language function components are replaced with the valid computer language function components from the repository at step 340. This process makes the expert case-based learning system 100 shown in FIG. 1 self-restoring in the event of a cyber-attack.

The process depicted in FIG. 3 may be performed by a computing device that is external to the expert case-based learning system 100 shown in FIG. 1. The computing device for performing secure static code analysis may be similar to that shown in FIG. 4 and described below.

Figure 4:
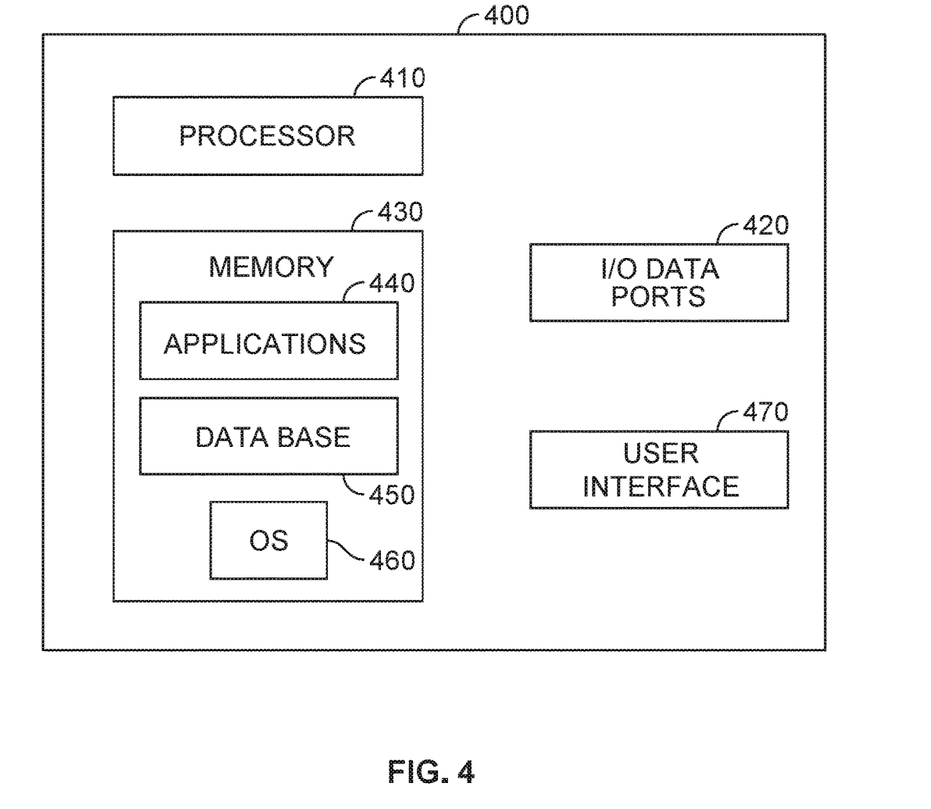
FIG. 4 illustrates a computing device that may be used in an expert case-based natural language learning system according to an illustrative embodiment.

FIG. 4 is an example block diagram of a computing device 400 with which various components of the expert case-based learning system, e.g., the bottom level case-based system 110, the blackboard database 140, and the top level expert system 150 may be implemented. The computing device 400 also represents a device for performing static code analysis according to illustrative embodiments. Although no connections are shown between the components illustrated in FIG. 4, those skilled in the art will appreciate that the components can interact with each other via any suitable connections to carry out device functions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Referring to FIG. 4, the computing device 400 may be implemented in any suitable computing device, e.g., a consumer laptop. The computing device 400 includes a processor 410 that receives inputs and transmits outputs via input/output (I/O) Data Ports 420. The I/O Data Ports 420 can be implemented with, e.g., any suitable interface (and/or user interface 470) through which data may be received and transmitted wired and/or wirelessly. For example, in the case of the computing device 400 used in the expert case-based learning system 100 shown in FIG. 1, the inputs may include NL sentential forms, responses to queries, corrected computer language function components, etc. Outputs may include, for example, queries to external systems for context information, queries to users for correction and/or verification, and computer language function components to be analyzed for security.

Although not shown, the computing device 400 may also include a physical hard drive. The processor 410 communicates with the memory 430 and the hard drive via, e.g., an address/data bus (not shown). The processor 410 can be any commercially available or custom microprocessor. The memory 430 is representative of the overall hierarchy of memory devices containing the software and data used to implement the functionality of the computing device 400. The memory 430 can include, but is not limited to the types of memory devices and computer-readable media described above. As shown in FIG. 4, the memory 430 may include several categories of software and data used in the computing device 400, including applications 440, a database 450, an operating system (OS) 460, etc.

The applications 440 can be stored in the memory 430 and/or in firmware (not shown) as executable instructions, and can be executed by the processor 410. The applications 440 include various programs that implement the various features of the computing device 400. For example, in the case of the expert case-based learning system 100 shown in FIG. 1, the applications 440 may include applications to implement the functions of the bottom level inference engine 115, the top level mapper 155, the translator 130, and the translator 170.

The database 450 represents the static and dynamic data used by the applications 440, the OS 460, and other software programs that may reside in the memory. The database 450 may be used to store various data including data needed to execute the applications 440. For example, in the case of the expert case-based learning system 100 shown in FIG. 1, the database 450 may store, e.g., case semantics, associations of situation semantic objects and action semantic objects, predefined rules, associations of computer language function components with situation semantic objects and action semantic objects, context information, and computer language function components to be checked for security. Although one database 450 is shown, it should be appreciated that the database 450 represents one or more databases that correspond to the case database 120, the computer language function component database 125, the blackboard database 140, the rules database 160 and the hash table 165 shown in FIG. 1.

While the memory 430 is illustrated as residing proximate the processor 410, it should be understood that at least a portion of the memory 430 can be a remotely accessed storage system, for example, a server on a communication network, a remote hard disk drive, a removable storage medium, combinations thereof, and the like.

It should be understood that FIG. 4 and the description above are intended to provide a description of a suitable device in which the various aspect of some embodiments of the present disclosure can be implemented. While the description includes a general context of computer-executable instructions, the present disclosure can also be implemented in combination with other program modules and/or as a combination of hardware and software in addition to, or instead of, computer readable instructions.

Further, although FIG. 4 shows an example of a computing device with components of the expert case-based learning system 100 and a cyber-security analyzing device may be implemented, those skilled in the art will appreciate that there may be other computer system configurations, including, for example, multiprocessors, parallel processors, virtual processors, distributed computing systems, microprocessors, mainframe computers, and the like.

According to the illustrative embodiments described above, context-sensitive languages may be effectively translated into effective code through the application of two-level knowledge-based systems. Randomization is realized through a bootstrapped system of systems approach, allowing for the randomization of the representation of knowledge. The capability for applying knowledge further enables automatic software synthesis, including knowledge-based optimization. Also, spirally-developed automatic programming through NL interaction is made possible, allowing for the realization of software systems too complex to write in any other way.

Further, the expert case-based natural learning device, system, and method described herein produce non-deterministic natural language explanations, which serves to make it far more trustworthy than deep learning, or any neural network.

Moreover, the expert case-based natural language learning device, system, and method described herein are cyber-secure and self-restoring in the event of a cyber-attack.

One application of the expert case-based natural language learning device, system, and method described herein may be for natural language programming and control of a mission assigned to an unmanned vehicle, e.g., an unmanned aerial vehicle (UAV). The device, system, and method described herein may allow a UAV swarm to be nonprocedurally programmed, thereby increasing the autonomous capabilities of the swarm. For example, the expert case-based natural learning device, system, and method described herein may be used to direct the soft landing of a UAV on a rocking ship using natural language, e.g., from human pilots in a shared airspace and/or other UAVs. Control of the UAV may be provided, e.g., by the bottom level case-based system 110 for simple NL commands and/or by the top level expert system 150 for more detailed NL commands. Those skilled in the art will appreciate that there may be many other useful applications of the expert case-based natural language learning device, system and method described herein.

The use of any examples, or example-language ("e.g.," "such as," etc.), provided herein is merely intended to better illuminate and is not intended to pose a limitation on the scope of the subject matter unless otherwise claimed. No language in the present disclosure should be construed as indicating that any non-claimed element is essential.

Many modifications and variations of the subject matter of the present disclosure are possible in light of the above description. Within the scope of the appended claims, the embodiments described herein may be practiced otherwise than as specifically described. The scope of the claims is not limited to the disclosed implementations and embodiments but extends to other implementations and embodiments as may be contemplated by those having ordinary skill in the art.

What is claimed is:

1. A computing device for expert case-based natural language learning, comprising:
   a blackboard database configured to store context information corresponding to case semantics associated with natural language sentential forms, wherein the case semantics include situation semantics and action semantics;
   a top level mapper configured to:
      query the blackboard database for the context information;
      map the situation semantics to the action semantics using the context information to form new case semantics; and
      store the new case semantics in a bottom level case database containing a plurality of case semantics;
   a bottom level case-based inference engine configured to match an input natural language sentential form to a matching case semantic among the plurality of case semantics stored in the bottom level case database; and
   a bottom level translator configured to translate the matching case semantic into natural language sentential form, wherein the bottom level case-based inference engine is further configured to post context information corresponding to the translated matching case semantic to the blackboard database.

2. The computing device of claim 1, wherein the top level mapper is configured to map the situation semantics to the action semantics according to predefined rules from a rules database.

3. The computing device of claim 2, wherein the predefined rules include rules for mapping the situation semantics to a randomized situation semantic.

4. The computing device of claim 3, wherein the predefined rules further include rules for mapping the randomized situation semantic to the action semantics.

5. The computing device of claim 4, wherein the predefined rules further include rules for mapping the action semantics to a randomized action semantic.

6. The computing device of claim 1, wherein the top level mapper is further configured to query an external system for additional context information.

7. The computing device of claim 6, further comprising a top level translator configured to translate a query for the additional context information into natural language sentential form.

8. The computing device of claim 1, wherein the situation semantics and the action semantics are associated with respective computer language function components, and the computing device further comprises a computer language function component database configured to store the respective computer language function components for checking against valid computer language function components in an external repository to provide for cyber-security.

9. A method for expert case-based natural language learning, comprising:
   matching, by a bottom level case-based system, an input natural language sentential form to a matching case semantic among a plurality of case semantics stored in a case database in the bottom level case-based system;
   translating, by the bottom level case-based system, the matching case semantic into natural language sentential form;
   posting, by the bottom level case-based system, context information corresponding to the translated matching case semantic to a blackboard database, wherein the blackboard database includes other context information corresponding to other case semantics associated with other natural language sentential forms;
   querying, by a top level expert system, the blackboard database for the context information corresponding to the translated matching case semantic and the other context information corresponding to the other case semantics, wherein the matching case semantic and the other case semantics include situation semantics and action semantics;
   mapping, by the top level expert system, the situation semantics to the action semantics according to predefined rules using the context information corresponding to the matching case semantic and the other context information corresponding to the other case semantics;
   forming, by the top level expert system, a new case semantic using the situation semantics mapped to the action semantics; and
   storing the new case semantic in the case database in the bottom level case-based system, thereby building upon the plurality of case semantics stored in the case database in the bottom level case-based system.

10. The method of claim 9, further comprising:
    forming, by the top level expert system, additional case semantics based on the other context information corresponding to the other case semantics; and
    storing the additional case semantics in the case database in the bottom level case-based system.

11. The method of claim 9, wherein matching comprises querying the case database in the bottom level case-based system for the matching case semantic.

12. The method of claim 9, wherein mapping the situation semantics to the action semantics comprises mapping the situation semantics to a randomized situation semantic.

13. The method of claim 12, wherein mapping the situation semantics to the action semantics further comprises mapping the randomized situation semantic to the action semantics.

14. The method of claim 13, wherein mapping the situation semantics to the action semantics further comprises mapping the action semantics to a randomized action semantic.

15. The method of claim 9, wherein mapping the situation semantics to the action semantics includes querying at least one of a user and a two-level knowledge based system for additional context information corresponding to the action semantics.

16. The method of claim 9, further comprising:
translating the new case semantic into natural language sentential form; and
providing the translated new case semantic for output.

17. A computer-based system for facilitating natural language learning, comprising:
a user interface configured to receive an input natural language sentential form;
a bottom level case-based system including:
a case database configured to store case semantics;
a bottom level inference engine configured to match the input natural language sentential form to a matching case semantic by querying the case database; and
a bottom level translator configured to translate the matching case semantic into natural language sentential form, wherein the bottom level inference engine is further configured to post context information corresponding to the translated matching case semantic;
a blackboard database configured to store the context information corresponding to the translated matching case semantic along with other context information corresponding to other case semantics associated with other natural language sentential forms, wherein the matching case semantic and the other case semantics include situation semantics and action semantics;
a top level expert system including:
a rules database configured to store predefined rules; and
a top level mapper configured to:
query the blackboard database for the context information corresponding to the matching case semantic and the other context information corresponding to the other case semantics;
map the situation semantics to the action semantics according to the predefined rules based on the context information corresponding to the matching case semantic and the other context information corresponding to the other case semantics;
form a new case semantic using the situation semantics mapped to the action semantics, wherein the new case semantic is stored in the case database.

18. The computer-based system of claim 17, wherein the predefined rules are populated in the rules database via interaction with users in natural language.

19. The computer-based system of claim 17, wherein the top level mapper is further configured to query at least one of a user and a two-level knowledge based system for additional context information corresponding to the action semantics.

20. The computer-based system of claim 17, wherein the bottom level translator is further configured to translate the new case semantic into natural language sentential form for output via the user interface for verification or correction.

* * * * *